Nov. 24, 1959     J. E. SCHRINER     2,914,437
METHOD OF MAKING MULTI-SURFACED SHEET MATERIAL
Filed March 22, 1954
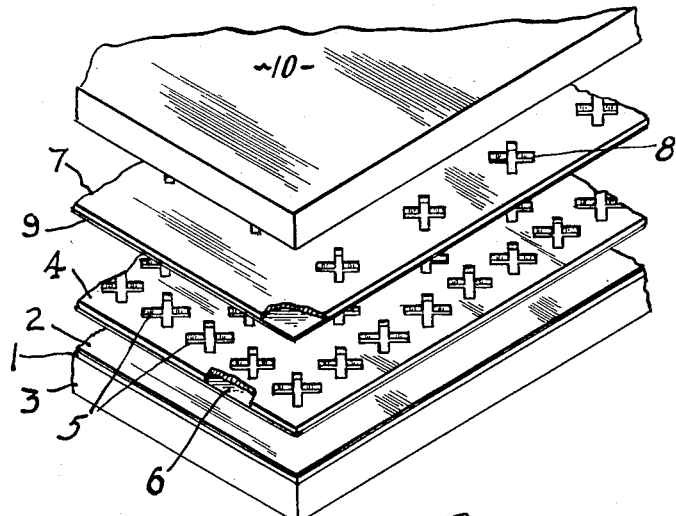
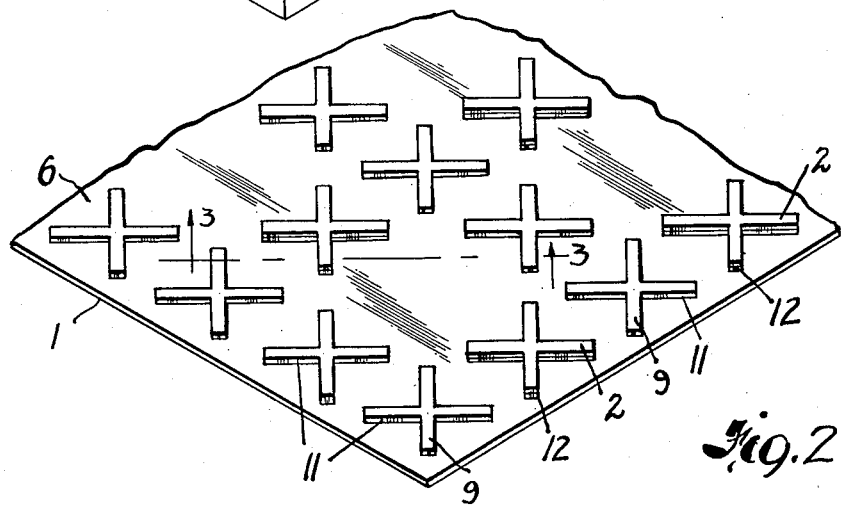
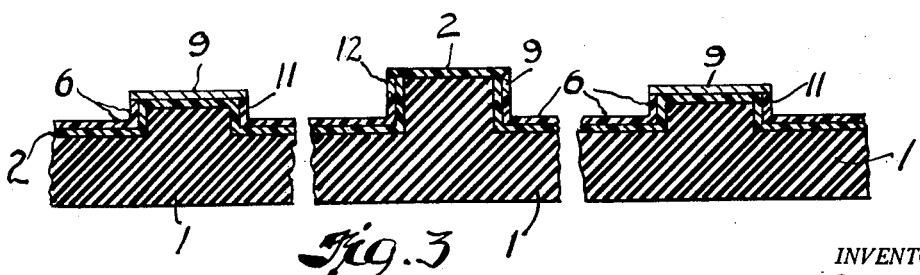
INVENTOR.
JOHN E. SCHRINER
BY
Oberlin & Limbach
ATTORNEYS.

United States Patent Office 2,914,437
Patented Nov. 24, 1959

2,914,437

METHOD OF MAKING MULTI-SURFACED SHEET MATERIAL

John E. Schriner, Willoughby, Ohio, assignor to The Eagle-Picher Company, Cincinnati, Ohio, a corporation of Ohio Application March 22, 1954, Serial No. 417,872

6 Claims. (Cl. 154—95)

This invention relates as indicated to multi-surfaced material, and more particularly to sheet material having embossed designs and the like of various shapes, color and elevation.

Many sheet material articles such as automotive floor mats, stair treads, door mats and the like are molded of rubber which has long been considered as the standard material for such purposes. There has, however, been a steadily increasing demand for articles of this general nature which are more decorative in appearance, longer wearing and more easily cleaned. The so-called "vinyl" plastics are excellent examples of such materials, being very decorative, long wearing and not nearly as susceptible to deterioration due to aging as is rubber. In the form of thin sheet materials, sometimes with fabric backing, the vinyl plastics are employed as decorative wall coverings, upholstery material and the like. They are, however, relatively much more costly than rubber which has militated against their extensive use for many purposes.

It is accordingly a principal object of my invention to provide novel sheet material which may, for example, have a relatively thin vinyl plastic surface and a backing or base layer of relatively inexpensive material such as rubber.

Another object is to provide such sheet material having a raised or embossed surface in any desired design with the different surfaces being of different colors.

A still further object is to provide such sheet material having a number of areas at a variety of different levels with each level being of a different color.

Yet another object is to provide a novel method of molding whereby the above structures and effects may be obtained.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a semi-diagrammatic view illustrating the manner in which my novel molding process is carried out;

Fig. 2 is a top perspective view of a section of my new molded sheet material; and Fig. 3 is an enlarged section taken on the line 3—3 on Fig. 2.

Now referring more particularly to said drawing and especially Fig. 1 thereof, in the embodiment of my invention there illustrated a relatively thick sheet of rubber base stock 1 having an upper surface provided with a thin coating 2 of vinyl plastic of desired color is placed upon a lower mold platen 3 and a thin perforated metal plate 4 is superimposed thereon having perforations of desired shape 5 therethrough. The underside of such plate 4 is also coated with a thin film 6 of vinyl plastic (which may be sprayed on) which may be of a color different from the coating 2 on the base stock. A second plate 7 is in turn superimposed on plate 4 provided with a smaller number of perforations 8 therethrough adapted to register at least in part with certain of the perforations 5 in plate 4. The underside of plate 7 is coated with a thin film of vinyl plastic of still another color 9, and an upper mold platen 10 completes the assembly. It will be understood, of course, that such vinyl coatings on the respective plates do not bridge the perforations therein.

The mold is then closed and heavy pressure imposed on the platens, together with application of heat to mold the coated base stock 1 and intrude the same into the perforations 5 and 8 to fill the latter. The films of colored vinyl are transferred to and adhere to the exposed surfaces of such intruded material. The mold is now cooled and opened, and the perforated plates 7 and 4 stripped from the molded sheet material.

Utilizing the particular perforated plate assembly shown in Fig. 1, multi-surfaced plastic sheet material is produced as illustrated in Fig. 2 comprising the sheet of base stock 1 having a principal upper surface coated with the colored vinyl plastic film 6 which has been received from the underside of plate 4. Series of protuberances or raised designs 11 are produced having an elevation equal to the thickness of perforated plate 4 since there were no corresponding apertures in the superimposed plate 7. The upper surfaces of such raised portions 11 are coated with the vinyl plastic film 9 transferred thereto from the underside of plate 7, the color of such film 9 ordinarily being selected to contrast with the color of the coating 6.

The intervening protuberances or raised areas 12 which are formed by the juxtaposed registered apertures 5 and 8 in plates 4 and 7 respectively are, of course, higher than the raised areas 11, being equal in height to the combined thickness of such plates 4 and 7. Their upper surfaces bear the exposed film 2 of vinyl plastic as originally deposited on base stock 1 inasmuch as they do not contact the coated undersides of either of plates 4 or 7, and the underside of mold plate 10 is not coated. The location of the several colored vinyl coatings on the finished article is further illustrated in Fig. 3 of the drawing.

It will thus be seen that in a single molding operation plastic sheet material has been produced having a raised or embossed design with such design being thus raised to several different levels and with the upper surface of each such level a different color. It will be obvious to those skilled in the art that by this arrangement a variety of attractive and interesting color patterns and designs may be achieved.

Moreover, the bulk of the sheet material, including even the raised areas or protuberances, may be comprised largely of relatively inexpensive base stock such as rubber composition, with the much more decorative and wear-resistant (but more expensive) vinyl surface being relatively thin. If desired, of course, the base stock may be backed by any desired sheet material such as various textile fabrics, paper, etc.

By way of illustration, a typical suitable base stock material may be compounded in accordance with one of the following formulations:

| 1. Predominantly Reclaim Parts | | 2. Predominantly Natural Rubber Parts | 3. Predominantly Synthetic Rubber Parts |
| --- | --- | --- | --- |
| Smoke sheets | 8.00 | 36.00 | GRS 42.00 |
| Non-stain whole tire reclaim | 51.00 | | |
| Para coumarone indene resin | 2.00 | 5.00 | 5.00 |
| Hard carolina clay | 10.00 | 10.00 | 10.00 |
| Ground limestone | 24.70 | 45.20 | 38.70 |
| Stearic acid | 1.25 | 1.25 | 1.25 |
| Zinc oxide | 1.00 | 1.00 | 1.00 |
| Lime-calcium oxide | .50 | | .50 |
| Sulfur | 1.00 | 1.00 | 1.00 |
| Primary accelerator | .45 | .45 | .45 |
| Secondary accelerator | .10 | .10 | .10 |
| Parts | 100.00 | 100.00 | 100.00 |

A typical suitable vinyl spray coat layer suitable for employment in accordance with my invention may be as follows:

| | Dry | Wet |
| --- | --- | --- |
| Polyvinyl chloride latex #576 | 100 | 200 |
| Polyblend latex #552 | 50 | 100 |
| Plasticizer, 50% Emulsion | 30 | 90 |
| Filler, 50% Emulsion | 40 | 120 |
| Color, 25% Paste | 10 | 20 |
| Parts | 230 | 530 |

Polyvinyl chloride=50% solids.
Polyblend=55% polyvinyl chloride and 45% butadiene acrylonitrile made as a combination latex, 50% solids.

A suitable plasticizer emulsion for the above vinyl spray coat formulation is as follows:

|  | Parts |
| --- | --- |
| Water | 33.00 |
| 28% ammonia | .40 |
| Di-octyl phthalate | 65.00 |
| Oleic acid | 1.60 |
|  | 100.00 |

A suitable filler emulsion for use in the above vinyl spray coat emulsion is the following:

|  | Parts |
| --- | --- |
| Titanium dioxide | 15.00 |
| Calcium carbonate | 20.00 |
| Carboxy methyl cellulose sodium salt | 1.20 |
| Water | 63.80 |
|  | 100.00 |

A suitable color emulsion for use in the foregoing formulation is as follows:

|  | Parts |
| --- | --- |
| Color pigment | 49.00 |
| Sodium metaphosphate | 1.00 |
| Water | 50.00 |
|  | 100.00 |

Before spraying the vinyl film 2 on the rubber base stock layer 1, a thin cement film will ordinarily first be applied, as is well known in the art, and a typical suitable formulation of such cement film is as follows:

|  | Parts |
| --- | --- |
| GRS 1001 | 45.0 |
| Marbon 8000, high styrene resin | 15.0 |
| Zenite accelerator | 2.4 |
| Thionex accelerator | 0.2 |
| Stearic acid | 0.5 |
| Zinc oxide | 3.0 |
| Heliozone | 2.0 |
| Titanox | 5.0 |
| Calcene, calcium carbonate | 21.9 |
| Green pigment, chrome oxide | 5.0 |
|  | 100.0 |

This cement film composition (stated in terms of solid content) may be made into a sprayable cement by mixing with an appropriate solvent, as for example 100 pounds to 25 gallons gasoline, 25 gallons xylol and 1.5 gallons of denatured alcohol. In the foregoing formulation for the cement film, Zenite is a tradename for a mixture of 90 percent zinc salt of 2-mercaptobenzothiazole and 10 percent hydrocarbon wax; Thionex is a tradename for tetramethyl-thiuram-monosulfide; Heliozone is an anti-oxidant and sun-check compound for rubber and synthetic rubber produced by Du Pont; and Titanox is a pigment containing 75 percent barium sulfate and 25 percent titanium oxide.

It will be appreciated that the various foregoing formulations do not themselves comprise a part of the present invention but are merely illustrative of the many types of stock and coating compositions which may be employed. Other plastics may be employed for the base stock instead of rubber, and other plastics may be employed for the coating compositions instead of the vinyl plastics. Indeed, the entire article may be of rubber (using colored rubber latices), or the entire article may be of vinyl plastic, or of other plastic material and yet obtain my novel embossed and multi-colored surface.

Examples of suitable thermoplastic materials include:

Vinyl polymers and copolymers (polyvinyl chloride, vinyl chloride-acetate copolymers, vinyl chloride-vinylidene chloride copolymers, vinyl acetate)
Vinylidene chloride resins (e.g. Dow "Saran")
Polystyrene
Polyamide resins (nylon)
Rubber hydrochloride ("Pliofilm")

Examples of suitable thermosetting resins include the well-known phenol-formaldehyde resins, melamine-formaldehyde resins, and polyester resins.

Synthetic rubbers include polychloroprene, butadiene-acrylonitrile copolymers, isobutylene-diolefin copolymers, and butadiene-styrene copolymers. These, as well as natural rubber, may be made into variously colored latices to form decorative surface coatings. The number of perforated sheets and accordingly the number of transfer colors which may be employed will depend on the thickness of such sheets and the moldability of the material.

The rubber base stock No. 1 listed above can be cured in about 10 minutes at 300° F. without harm to the vinyl coatings and, after cooling, the finished molded article is stripped from the perforated plates. When all components are thermoplastic, they need merely be heated to mold and then cooled to strip. Thermosetting materials may be stripped as soon as they have set, without cooling.

While the base layer will ordinarily desirably be flexible, it may be rigidified by mounting on a suitable backing such as metal sheet or plywood, or it may be formed of certain relatively hard and stiff plastic materials such as certain of the melamine resins. Fabrics such as duck may also be employed as backing material for both the flexible and rigid forms. Some types of my new material are suitable for use as upholstery and as wall coverings.

When rubber base stock is employed with a thin cement coating, the latter should be dried before application of other plastic films. The rubber or other base stock may itself be colored and various attractive designs may be produced without first color-coating the same or coating the underside of the contiguous apertured plate. The mold platen bearing on the uppermost plate may be color-coated to coat the highest protuberances instead of first coating the base stock prior to molding but it is sometimes rather difficult to clean the platen subsequently.

Also, if desired, some or all of the apertures in the lower plate may coincide with corresponding apertures in the upper plate of somewhat smaller diameter so that stepped protuberances are formed which may have their several surfaces differently colored. Even when employing but a single perforated plate, the underside of which has been color-coated with a suitable plastic film, attractive designs may be formed with the ends of the molded protuberances disclosing the original color of the base stock surface. As will readily be understood, the sheet of base stock may be interposed between two perforated plates (or two sets of such plates) so that both sides will be molded and decorated in the manner described upon imposition of pressure by the mold platens.

Other modes of applying the principle of the invention may be employed, change being made as regards the details described, provided the features stated in any of the following claims or the equivalent of such be employed.

I therefore particularly point out and distinctly claim as my invention:

1. The method of forming multi-colored multi-surfaced plastic sheet material which comprises coating a sheet of rubber base stock with a thin coating of cement, drying such coating, spraying such coated rubber surface with a thin coating of colored vinyl plastic, superimposing a thin perforated metal plate thereon having a thin vinyl plastic coating on the underside thereof of a color different from that on such rubber surface, superimposing a second thin perforated metal plate on such first plate, said second plate having perforations registering with only certain of such perforations in such first plate, the underside of such second plate having a thin vinyl plastic coating thereon of a color different from that of any of said other vinyl coatings, applying molding pressure to such assembly to force such rubber into such perforations to take the form thereof while heating to soften such vinyl coatings to cause the same to adhere to the resultant molded article where contacting the same, and cooling and stripping such resultant molded article from such plates.

2. The method of forming multi-colored multi-surfaced plastic sheet material which comprises coating a sheet of rubber base stock with a thin coating of colored plastic material, superimposing a thin perforated mold plate thereon having a thin plastic coating on the underside thereof of a color different from that on such rubber stock, superimposing a second thin perforated mold plate on such first mold plate, said second plate having perforations registering with only certain of such perforations in such first plate, the underside of such second plate having a thin plastic coating thereon of a color different from that of any of said other coatings, applying molding pressure to such assembly to force such rubber into such perforations to take the form thereof, heating such assembly to cure such base stock and transfer such coatings from such plates to such stock where they contact the same, and cooling and stripping the resultant molded coated article from such plates.

3. The method of forming multi-colored multi-surfaced plastic sheet material which comprises coating a sheet of moldable plastic base stock with a thin coating of colored plastic material, superimposing a thin perforated mold plate thereon having a thin plastic coating on the underside thereof of a color different from that on such base stock, superimposing a second thin perforated mold plate on such first mold plate, said second plate having perforations registering with only certain of such perforations in such first plate, the underside of such second plate having a thin plastic coating thereon of a color different from that of any of said other coatings, applying molding pressure to such assembly to force such base stock into such perforations to take the form thereof, transferring such coatings from such plates to such base stock where they contact the latter, and stripping the resultant molded coated articles from such plates.

4. The method of forming multi-colored multi-surfaced plastic sheet material which comprises superimposing a plurality of thin perforated mold plates on a sheet of moldable plastic base stock, the undersides of such plates being coated with thin coatings of plastic material adapted to be transferred and adhered to such base stock and certain only of such perforations in such plate next such base registering with perforations of the next adjacent plate, applying mold pressure to such assembly to force such base stock into such perforations to take the form thereof, transferring such coatings from such plates to such base stock where they contact the latter, and stripping the resultant molded coated article from such plates.

5. The method of molding plastic sheet material which comprises superimposing a plurality of thin perforated mold plates on a layer of such material, arranging such plates with certain of such perforations in the plates contiguous to such layer being registered with perforations in an overlying plate but with such latter plate blocking certain other of such perforations in such plate contiguous to such plastic layer, forcing such material into such perforations to mold protuberances of correspondingly different height projecting from such layer, and stripping such plates from the resultant molded sheet.

6. The method of forming multi-colored multi-surfaced plastic sheet material which comprises superimposing a plurality of thin perforated mold plates on a sheet of moldable plastic base stock, the undersides of such plates above the bottommost plate being coated with thin coatings of plastic material adapted to be transferred and adhered to such base stock and certain only of such perforations in such plate next such base registering with perforations of the next adjacent plate, applying molding pressure to such assembly to force such base stock into such perforations to take the form thereof, transferring such coatings from such plates to such base stock where they contact the latter, and stripping the resultant molded coated article from such plates.

References Cited in the file of this patent

UNITED STATES PATENTS

| 380,099 | Duncan | Mar. 27, 1888 |
| 644,530 | Mercer | Feb. 27, 1900 |
| 2,134,737 | Riedel | Nov. 1, 1938 |
| 2,206,078 | Cunnington | July 2, 1940 |
| 2,401,281 | Webb | May 28, 1946 |
| 2,439,137 | Keller | Apr. 6, 1948 |
| 2,467,322 | Lightbown et al. | Apr. 12, 1949 |
| 2,533,976 | Teague | Dec. 12, 1950 |
| 2,568,458 | Nichols | Sept. 18, 1951 |
| 2,572,470 | Gordon | Oct. 23, 1951 |
| 2,593,286 | Fermanian et al. | Apr. 15, 1952 |

FOREIGN PATENTS

| 3,026 | Great Britain | 1900 |
| 635,091 | Great Britain | Apr. 5, 1950 |
| 654,645 | Great Britain | June 27, 1951 |